United States Patent [19]

van der Meulen

[11] Patent Number: 4,830,745
[45] Date of Patent: May 16, 1989

[54] PROCESS FOR REMOVING WATER AND/OR OTHER VOLATILE IMPURITIES FROM LUBRICATING OILS AND DEVICE FOR CARRYING OUT THE PROCESS

[76] Inventor: Alfred van der Meulen, Koloman Wallischgasse 27, A-8605 Kapfenberg, Austria

[21] Appl. No.: 251,058

[22] Filed: Sep. 26, 1988

Related U.S. Application Data

[63] Continuation of Ser. No. 062,463, filed as PCT AT85/00033 on Sep. 24, 1985, published as WO87/01609 on Mar. 26, 1987, abandoned.

[51] Int. Cl.$^4$ .......................... B01D 35/18; B01D 3/28
[52] U.S. Cl. .................................... 210/168; 210/180; 210/416.5; 210/436; 196/46.1; 196/115; 184/6.24
[58] Field of Search .................. 184/6.22, 6.24, 104.2; 210/186, 182, 184, 472, 168, 416.5, 436; 196/46.1, 115; 123/196 A, 196 AB

[56] References Cited

U.S. PATENT DOCUMENTS

| | | | |
|---|---|---|---|
| 2,005,515 | 6/1935 | Winkler | 165/168 X |
| 2,513,898 | 7/1950 | Switzer et al. | 165/168 X |
| 2,696,714 | 12/1954 | Hughes | 165/164 X |
| 3,915,860 | 10/1975 | Priest | 210/180 X |
| 3,945,464 | 3/1976 | Sato | 184/6.24 X |
| 4,295,966 | 10/1981 | LeBlanc et al. | 210/180 |
| 4,354,946 | 10/1982 | Warlick et al. | 210/180 X |
| 4,443,334 | 4/1984 | Shugarman | 196/115 X |
| 4,717,472 | 1/1988 | Oberg | 210/168 |

Primary Examiner—Leonard E. Smith
Attorney, Agent, or Firm—Remy J. VanOphem

[57] ABSTRACT

An oil purifier for removing contaminants, particularly volatile contaminants. Oil enters an inlet, passes through a filter, a felt layer, a plurality of capillaries, and then spreads across an evaporation plate to an oil outlet. The oil is heated as it spreads across the evaporation plate, either by an external energy source or by hot engine oil, causing volatile contaminants to evaporate and be discharged out a second outlet. The gas pressure above the evaporation plate is kept substantially reduced below atmospheric pressure in order to minimize both the required evaporator plate size and the temperature of the oil spreading thereover and yet provide the desired evaporation rate of the volatile contaminants.

8 Claims, 4 Drawing Sheets

PROCESS FOR REMOVING WATER AND/OR OTHER VOLATILE IMPURITIES FROM LUBRICATING OILS AND DEVICE FOR CARRYING OUT THE PROCESS

This is a continuation of application Ser. No. 062,463, filed as PCT at 85/00033 on Sep. 24, 1985, published as WO87/01609 on Mar. 26, 1987, now abandoned.

BACKGROUND OF THE INVENTION

1. Field of the invention

The invention relates to a process for removing water and/or other volatile impurities from lubricating oils, particularly as this relates to internal combustion engines, of the kind wherein lubricating oil is, preferably after having been passed through a filter of, for example, fiber material, supplied to a heated evaporation chamber, where the water and/or the other volatile impurities are evaporated and from which escape gases generated during evaporation. The invention further relates to a device for carrying out the aforesaid process.

2. Description of the prior art

It is known that the contaminants in lubricating oils as, for example lubricating oils in internal combustion engines, result in increased wear and reduced efficiency of machines which are lubricated thereby. Solid contaminants, such as dirt, metal particles or the like, can be removed in a simple manner by conventional filters, for example of fiber material, through which is passed the lubricating oil, the solid constituents being thereby retained. Lubricating oils can also contain, however, water and other volatile impurities, which equally give rise to an increased wear of the internal combustion engines on account of forming, for example, an acid which attacks the walls of the pistons and cylinders. For the purpose of removing from lubricating oils these liquid and volatile impurities, it has already been proposed to introduce the lubricating oil to be purified into a heated evaporation chamber, where the lubricating oil is spread over a great surface and is simultaneously heated, so that the liquid or volatile impurities to be removed are evaporated. The gases generated during this evaporation are, in the known device for this purpose, escaping via an exit opening into the atmosphere, and the purified lubricating oil is supplied to be reused, i.e., supplied to the oil pan of an internal combustion engine, for example.

For achieving a complete removal of the liquid or volatile impurities it is necessary that all impurities to be removed evaporate within the evaporation chamber. Such a complete evaporating requires, in the known device, a great spreading surface for the oil as well as a high evaporation temperature. The spreading surface for the oil is, however, limited by the size of the device, which cannot be made large without any limitations due to space requirements. Excessively high evaporating temperatures result in destruction of the lubricating oil. For this reason, it was up until now not possible to achieve a complete removal of the impurities from lubricating oils by means of the known device.

SUMMARY OF THE INVENTION

It is the task of the present invention to avoid this drawback and to provide a process for removing water and/or other volatile impurities from lubricating oils, whereby it is in practice made possible to completely remove these impurities without increasing the volume of the device and without increasing the temperature. The process acccording to the invention is essentially characterized in that a reduced pressure, preferably between 20 and 30 millibar, is maintained within the evaporation chamber. This reduced pressure permits the degree of evaporation to be increased without any enlargement of the evaporation surface and without increasing the evaporation temperature, as compared with using identical known devices heretofore available, such that a substantially better efficiency and a practically complete removal of the impurities is obtained.

If the lubrication oil flows between the lubricating locations and the filter along a closed circuit, this lubricating oil can, according to a further feature of the invention, be first mechanically filtered, noting that downstream of this mechanical filtering stage the main flow of the lubricating oil is directly recycled to the lubricating locations, whereas a side stream branched off from the main stream is recycled to the lubricating locations via the filter and the evaporation chamber. When operating in this manner, the lubricating oil flowing along the closed circuit is not always, as a whole, purified of the liquid or volatile impurities; rather only the portion of the oil flowing within the side stream is purified. This is, however, sufficient because the lubricating oil is permanently passed along a closed circuit and the lubricating oil is, on the whole, purified from the liquid and volatile impurities and because these impurities are not regenerated at such a rate that the entire volume of lubricating oil has to be passed via the evaporation chamber. However, such a procedure provides the possibility of utilizing a smaller device for removing the liquid and other volatile impurities, so that there is not only obtained a reduction in costs but also of the space requirement of the invention.

The preferred embodiment of the device for carrying out the process of the present invention is equipped with a heated evaporation chamber having at least one inlet opening for the lubricating oil to be purified and is preferably interconnected with a space including a filter, an outlet opening for the purified lubricating oil and an outlet opening for the gases generated during evaporation and is essentially characterized in that the outlet opening is interconnected with a vacuum source via a conduit. By use of a vacuum source, the required reduced pressure is maintained within the evaporation chamber, so that the degree of evaporation is increased without increasing the evaporation temperature and a better efficiency with respect to the removal of liquid and volatile impurities is, thus, obtained.

While up until now heating of the evaporation chamber was, as a rule, effected by means of electrical heating coils energized by external electrical energy, the arrangement can, in a device according to the invention, be such that a tubular conduit connected with the inlet opening for the lubricating oil to be purified is provided in a wall delimiting the evaporation chamber and/or directly within the evaporation chamber. The lubricating oil, which has been heated during lubricating an internal combustion engine, for example, and which has to be cooled down in any event transfers a major part of its heat content into the evaporation chamber when flowing through this tubular conduit, so that it is, as a rule, not necessary to heat this evaporation chamber by means of external energy or at least a substantially reduced amount of external energy is required for heating the evaporation chamber. It is convenient if the tubular conduit is designed as a spiral, so that the path covered by the flowing lubricating oil when heating the evaporation chamber is long and, thus, a major part of heat energy is transferred.

If the tubular conduit is arranged directly within the evaporation chamber, the heat energy is immediately transmitted via the wall of the tubular conduit. As already mentioned, it is, however, also possible to provide the tubular conduit within a wall delimiting the evaporation chamber. In this case, it is of advantage if the tubular conduit is, according to the invention, arranged within a cover delimiting the evaporation chamber and consisting of two parts, in which case the separating gap between the two parts extends approximately along the centerline of the tuular conduit, and, thus, subdivides the whole tubular conduit into two halves. A mechanical filter, preferably a filter sieve, is arranged within the separating gap. The already mentioned mechanical filtering of the lubricating oil can be effected by means of this filter sieve, if the lubricating oil is supplied at one end of the tubular conduit into one half thereof and the lubricating oil is discharged at the other end of the tubular conduit in the other half thereof. The pre-filtered lubricating oil can then be subdivided in the already described manner into a main stream and into a side stream, noting that the main stream is directly recycled to the lubricating locations, whereas the lubricating oil of the side stream is, prior to being recycled, purified of liquid and volatile impurities.

When using the device together with an internal combustion engine including an exhaust-type supercharger, the outlet opening for the gases generated during evaporation is conveniently connected via a conduit with the air suction conduit of this exhaust-type supercharger. In this case, the gases generated during evaporation are sucked into the supercharger via the air suction conduit, due to the reduced pressure prevailing within the supercharger. The gases are then directed into the combustion chamber of the internal combustion engine, whereby they are practically completely burned. Combustion residues, if present at all, flow into the atmosphere via the exhaust pipe.

It is, however, also possible that the outlet opening be connected via a conduit with the suction conduit for fresh air or with the suction conduit for the fuel-air mixture of the internal combustion engine. Also in this case, the gases generated during evaporation are supplied under the action of the reduced pressure prevailing within the suction conduit into the combustion chamber of the internal combustion engine and are burned there.

In internal combustion engines of higher power, for example in Diesel engines having a power of 190 to 270 Kilowatts and including an exhaust-type supercharger, the required reduced pressure will prevail within the evaporation chamber. If the power of the engine should be insufficient for establishing this reduced pressure within the evaporation chamber, a vacuum pump could additionally be interconnected into the conduit leading from the outlet opening for the gases generated during evaporation to the air suction conduit of the exhaust-type supercharger.

Of course, it is also possible to maintain the reduced pressure within the evaporation chamber by such an air pump alone and to discharge the gases directly into the atmosphere.

To prevent condensed water from being supplied via the conduit connected with the outlet opening to the internal combustion engine or to the connected supercharger, respectively, which could, for example, result in destruction of the supercharger, it is, accordingly to a further feature of the invention, desirable to interconnect a water separator into the conduit connected with the outlet opening.

DETAILED DESCRIPTION OF THE PREFERRED EMBODIMENTS

Figure 1:
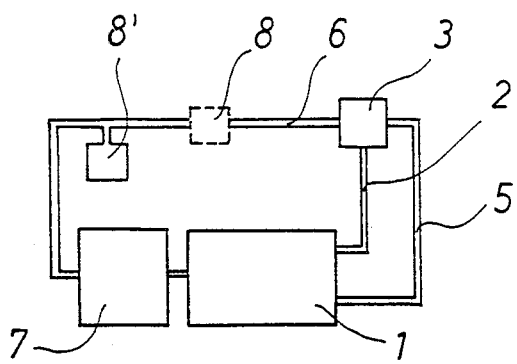
FIG. 1 is a schematic illustration of the preferred embodiment according to the invention.

As can be understood by reference to FIG. 1, at least a portion of the lubricating oil to be purified is supplied from a schematically shown internal combustion engine 1 via a conduit 2 to a purifying device 3 equipped with an evaporation chamber 4 (see FIGS. 2 to 4), where evaporation of the liquid and volatile impurities of the lubricating oil occurs. The purified lubricating oil is, via a conduit 5, recycled into the oil pan of the internal combustion engine 1. A conduit 6 leads from the evaporation chamber 4 to the air suction intake of an exhaust-type supercharger 7 for the internal combustion engine 1. A vacuum pump 8 may be interconnected with the conduit 6. Furthermore, it is desirable to provide a water separator 8' within the conduit 6, for discharging the water which has condensed within the conduit 6, to prevent damage to the exhaust-type supercharger 7 and/or the internal combustion engine 1.

Figure 2:
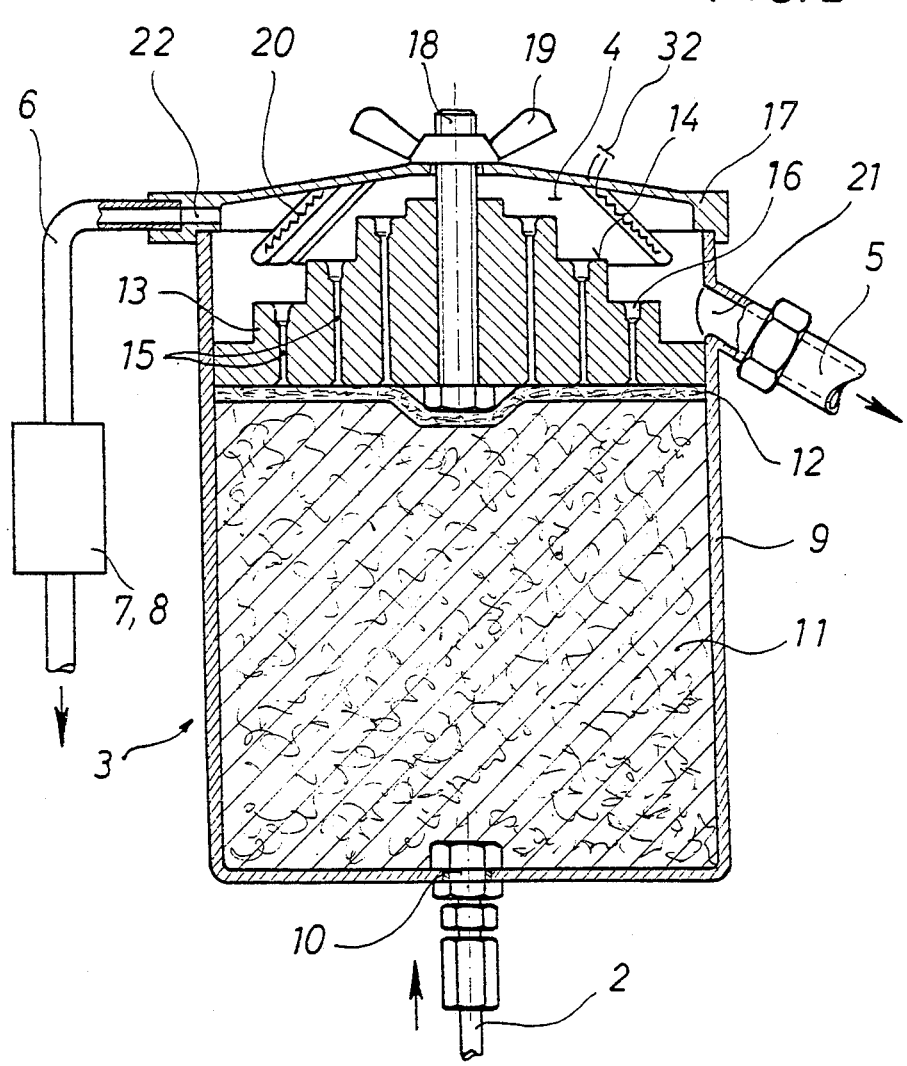
FIG. 2 shows a sectional view of the preferred embodiment.

The purifying device 3 shown in FIG. 2 has a cup-shaped housing 9, having provided in its bottom an inlet opening 10 for the lubricating oil to be purified, the inlet opening being connected with the conduit 2. Within the lower portion of the cup-shaped housing 9, there is located a filter 11 of fibrous material which is covered by a felt cushion 12. Above the felt cushion 12, there is arranged an evaporation plate 13 having a stepped surface 14 at its side facing the evaporation chamber 4. At the top side of the individual steps, there open channels 15 extending from the felt cushion 12 and having an enlargement 16 within the area of their mouths opening into the evaporation chamber 4. The cup-shaped housing 9 is covered by a cover 17, which is secured by a screw 18 and a thumb nut 19 and which carries at its inner side electrical heating coils 20 which are supplied with electrical current via conduits 32. The evaporation chamber 4 is heated by the heating coils, so that the liquid and volatile constituents of the lubricating oil contained within the evaporation chamber are evaporated. The purified oil is discharged via an outlet opening 21 which is connected with the conduit 5. There is further provided an outlet opening 22 for the impurities to be removed which is connected with the conduit 6.

The operation of the device shown in FIG. 2 is as follows:

The lubricating oil to be purified arrives within the interior of the cup-shaped housing 9 via the inlet opening 10 and penetrates the filter 11 as well as the felt cushion 12. Any solid impurities are, thus, retained. Subsequently, the lubricating oil to be purified rises upwardly through the channels 15 provided in the evaporation plate 13 into the evaporation chamber 4, where expansion within the enlargements 16 results in the liquid or volatile impurities being already partially evaporated. The lubricating oil spreads on the stepped surface 14 of the evaporation plate 13 and flows downwardly along the steps. Simultaneously it is heated by the heating coils 20. This results in further evaporation of the liquid and volatile impurities. The gases generated during this evaporation are discharged via the outlet opening 21 into the conduit 5 via which it is recycled to the oil pan of the internal combustion engine 1.

The outlet opening 22 is now connected via the conduit 6 with a vacuum source, which can, for example, be provided in the air suction conduit by having a reduced pressure prevailing therein due to operation of the exhaust-type supercharger 7, of the vacuum pump 8 or of both the air suction conduit of the supercharger 7 and of the vacuum pump 8. If no exhaust-type supercharger 7 is provided, the conduit 6 opens into the suction conduit for fresh air or fuel-air mixture of the internal combustion engine where an equally prevailing reduced pressure exists. A reduced pressure is, thus, formed within the evaporation chamber 4, whereby a more rapid evaporation and, thus, a complete purification of the lubricating oil is achieved.

The embodiment according to FIG. 3 differs from the embodiment according to FIG. 2 in that the conduit 2 is connected with a conduit 23, which runs according to a spiral-shape within recesses 24 provided on the inner side of the cover 17 in an inward direction, starting from the periphery, and finally via a tube 25 into a chamber 26, which is located below the filter 11 and from which chamber 26 the lubricating oil to be purified flows, thereby first penetrating the filter 11 as well as the felt cushion 12, again via the open channels 15 provided in the evaporation plate 13 into the evaporation chamber 4. Heating of the oil within the evaporation chamber 4 is, in this case, not effected by heating coils to be energized by external energy but by the lubricating oil to be purified, which is supplied by the conduit 2 and has a high temperature and transfers its heat content to the evaporation chamber 4 when flowing through the spiral-shaped tubular conduit 23. If the heat content of the oil to be purified is insufficient for the required heating of the evaporation chamber 4 or of the oil contained therein, electrical heating coils may, of course, be provided in addition to the tubular conduit 23.

Figure 3:
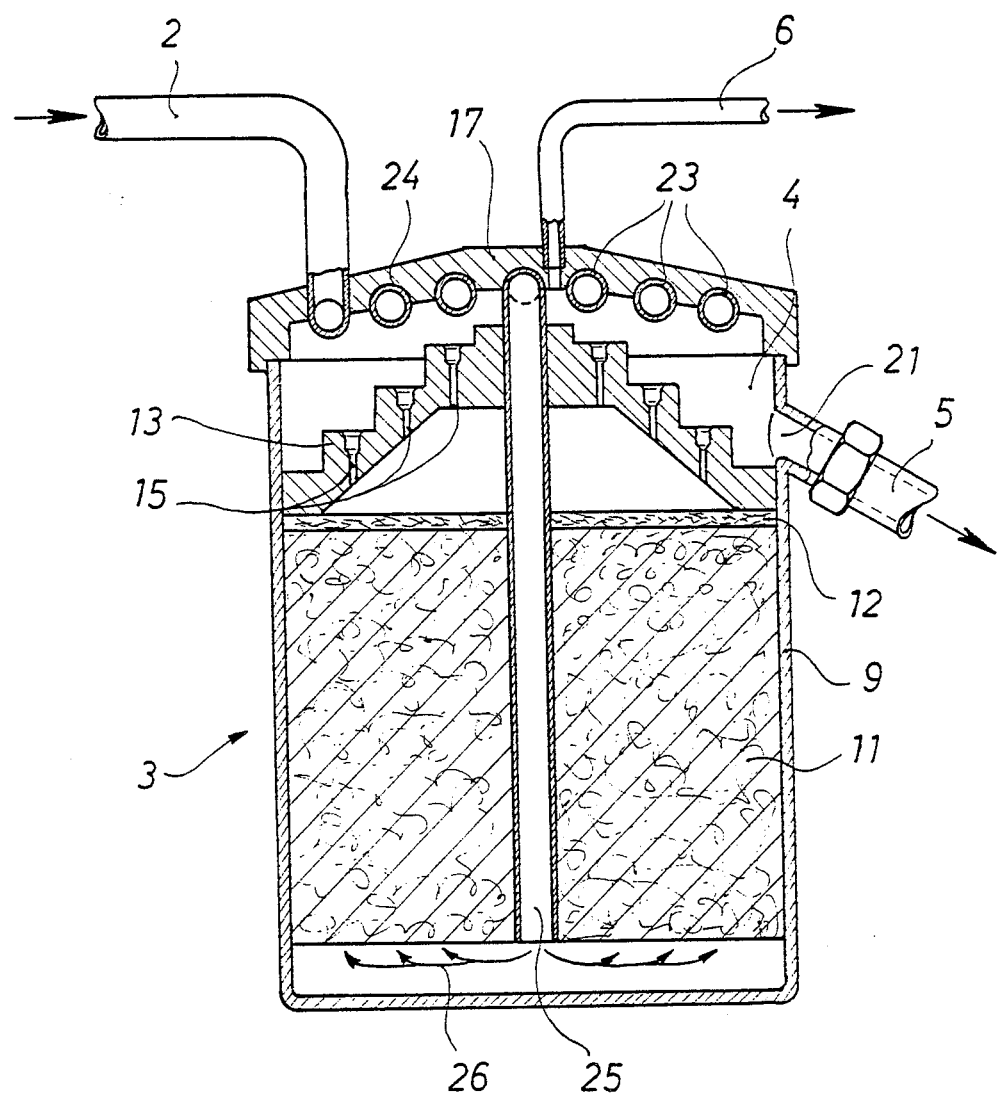
FIGS. 3, 4 and 5 show alternative preferred embodiments of the invention corresponding to that shown in FIG. 2.
Figure 4:
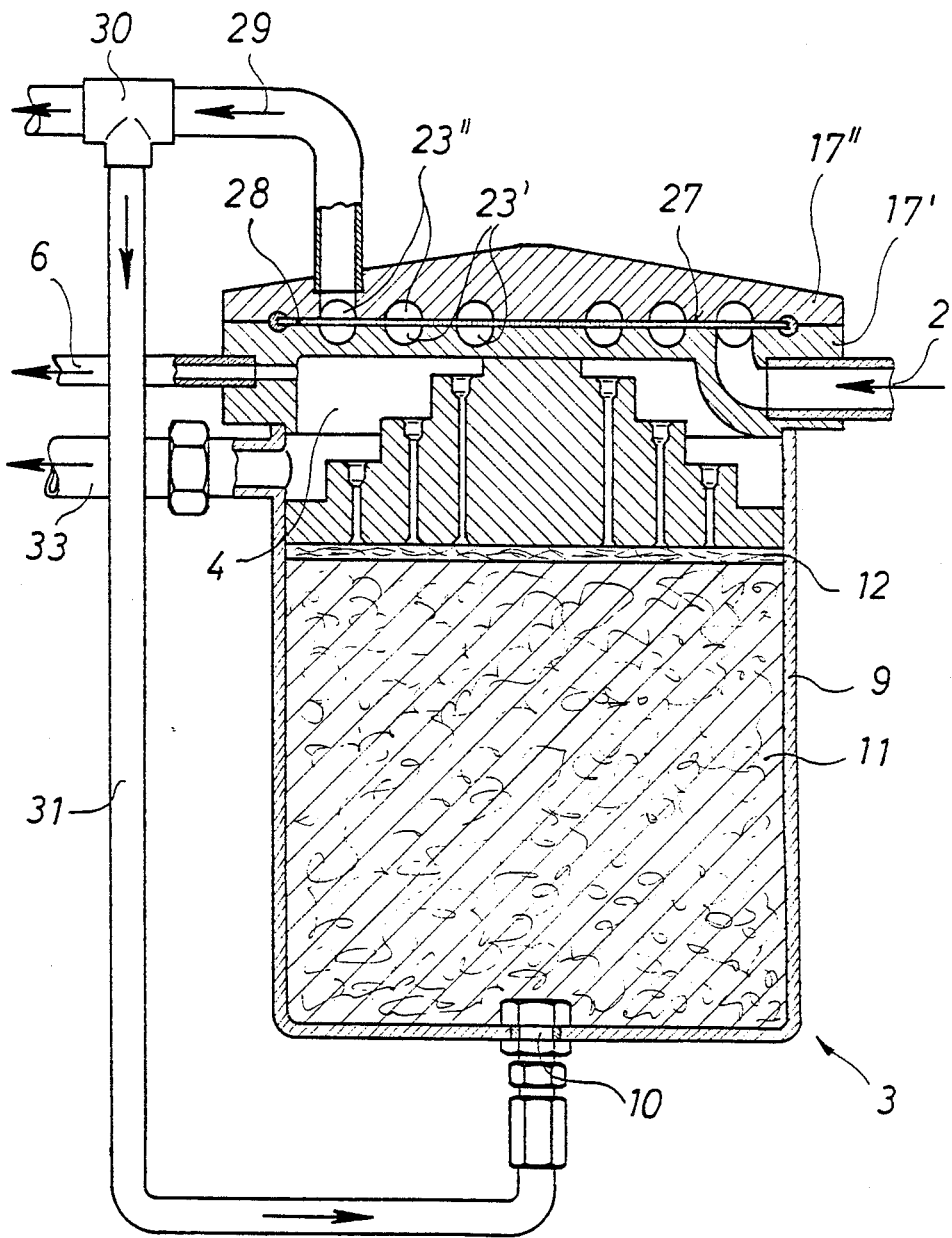

FIG. 4 differs from the embodiment according to FIG. 3 in that the tubular conduit 23 is not arranged at the top side of the cover 17, facing the evaporation chamber 4 and located within the evaporation chamber, but is instead provided within the interior of the cover 17. In this arrangement, the cover 17 consists of two parts 17' and 17", where a separation gap 27 extends approximately through the centerline of the tubular conduit 23, so that the tubular conduit 23 is subdivided into a lower half 23' and into an upper half 23". Within the separation gap 27 there is now located a filter sieve 28, preferably of metal, which also subdivides the tubular conduit 23. If the oil to be purified is supplied via the conduit 2 into the lower area 23' of the tubular conduit 23 and is discharged from the upper area 23", the lubricating oil is purified of solid foreign matter, such as abraded metal particles or the like, by the filter sieve 28.

A further difference with respect to the embodiment according to FIG. 3 resides in that the embodiment according to FIG. 4 the tubular conduit 23 does not open into the chamber 26 via the tube 25, but is instead connected with the oil pan of the internal combustion engine 1 via a conduit 29. A branching piece 30 is, however, interconnected with the conduit 29 and is in turn connected, via a conduit 31, with the inlet opening 10 at the bottom of the cup-shaped housing 9. In this embodiment, the main stream of the oil has been purified by the filter sieve 28 only and is directly recycled to the internal combustion engine 1, while a side stream arrives via the conduit 31 in the interior of the cup-shaped housing and is subjected thereat to a purification step in the same manner as in the embodiment according to FIGS. 2 and 3. The lubricating oil having been purified in this manner and, thus, having been freed also of volatile and liquid impurities is again recycled via the conduit 33 into the oil pan of the internal combustion engine 1, the gases generated during evaporation of the liquid and volatile impurities again being sucked off in the described manner via the conduit 6, utilizing, as mentioned above, a vacuum pump 8 and/or a water separator 8'. The volatile impurities are then burned in the internal combustion engine 1.

Figure 5:
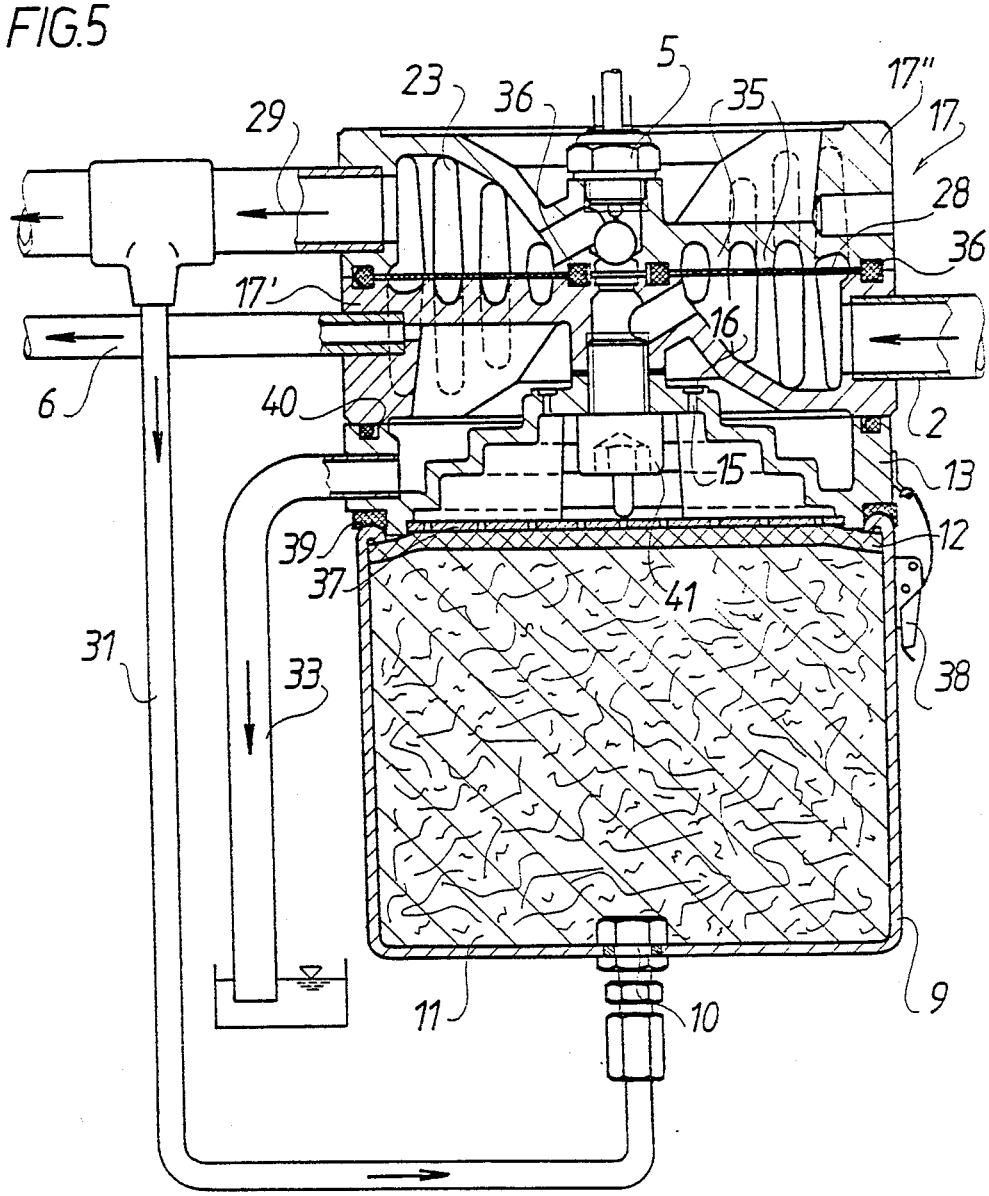

The embodiment according to FIG. 5 is similar to that according to FIG. 4. The conduit 2, via which the main stream of the oil is supplied, is located at a lower level than the conduit 29, via which the main stream of oil is discharged or, respectively, is again supplied via the branch conduit 31 to the inlet opening 10. This results in a longer flow path within the cover 17, whereby the heat of the oil is better utilized. For the same purpose, the conduit 23 within the cover 17 is provided with several ribs 35, which result in an increased heat transfer to the material of the cover 17. The filter sieve 18 is compressed by means of a rubber seal 36 between both cover parts 17", 17", which simultaneously results in sealing both cover parts 17", 17" one against the other. The filter 11 for the side stream, which filter consists of cellulose wadding, is covered on top by a felt disc 12 and held in position by a perforated plate 37 which is seated within a recess of the evaporation plate 13. The evaportion plate 13 is, with interposition of a seal 39, connected with the cup-shaped housing 9 by means of a clamp fastener 38. A further seal 40 seals the evaporation plate 13 relative to the lower cover part 17'. Both these parts are held in mutual contact by a central screw 41 being supported with its head on the evaporation plate 13 and are screwed into a central bore of the lower cover part 17'. This embodiment has a particularly high efficiency.

To those skilled in the art to which this invention appertains, the above described preferred embodiment may be subject to change or modification. Such changes or modifications can be carried out without departing from the scope of the invention, which is intended to be limited only by the scope of the appended claims.

I claim:

1. A device for purifying lubricating oil of impurities, said lubricating oil flowing as a result of being pumped by a pump means, said device comprising:
   a chamber having at least one inlet for said lubricating oil, said chamber having a first outlet passage for said lubricating oil, said chamber further having a second outlet for extracting said impurities;
   an evaporator plate located in said chamber, said evaporator plate having a first side and a second side opposite to said first side, said evaporator plate further mounted in said chamber to define an evaporation chamber adjacent said first side of said evaporator plate and a filtration chamber adjacent said second side of said evaporator plate, said evaporator plate further having a plurality of channels between said first side and said second side thereof, said plurality of channels fluidically communicating with said at least one inlet of said chamber, said evaporation chamber fluidically communicating with said second outlet of said chamber;

a source of vacuum connected with said second outlet of said chamber for maintaining said evaporation chamber at a gas pressure substantially below atmospheric pressure;

a first half cover having a first side mounted to one end of said evaporation chamber for sealing said evaporation chamber, said first half cover further having a second side having a spiral-shaped first channel therein;

a second half cover having a first side mounted complementary to said second side of said first half cover, said first side of said second half cover having a spiral-shaped second channel complementary with said spiral-shaped first channel of said first half cover to form a spiral-shaped passage having an inlet passage in one of said first half cover and second half cover and an outlet passage in the other of said first half cover and second half cover whereby hot lubricating oil enters said inlet passage and flows through said spiral-shaped passage into one of said spiral-shaped first and second channels then into the other of said spiral-shaped first and second channels and continues into said spiral-shaped passage out of said outlet passage before said hot lubricating oil flows into said filtration chamber such that said hot lubricating oil heats said evaporation chamber;

filtering means mounted in said filtration chamber such that said lubricating oil enters said at least one inlet of said chamber and flows through said filtering means into said plurality of channels of said evaporator plate into said evaporation chamber whereby impurities are evaporated from said lubricating oil and flow into said second outlet of said chamber while said purified lubricating oil flows along said first outlet passage of said chamber; and heating means connected with said chamber for heating said lubricating oil while said lubricating oil flows over said evaporator plate from said plurality of channels to said first outlet passage of said chamber.

2. The device for purifying lubricating oil of impurities of claim 1, wherein said source of vacuum comprises a supercharger for an internal combustion engine connected to said second outlet of said chamber, said supercharger cooperating with said chamber so as to maintain a constant value of reduced pressure which is substantially below atmospheric pressure in said evaporation chamber irrespective of operation of said supercharger.

3. The device for purifying lubricating oil of impurities of claim 1, wherein said inlet of said spiral-shaped passage is located in mutual offset relation with respect to said outlet of said spiral-shaped passage so as to aid heat transfer from said spiral-shaped passage to said evaporation chamber; said device for purifying lubricating oil of impurities further comprising rib means integral with said first half cover and said second half cover to aid heat transfer from said spiral-shaped passage to said evaporation chamber.

4. The device for purifying lubricating oil of impurities of claim 1, wherein said evaporator plate forms a separate part of said chamber, said device for purifying lubricating oil further comprising:

first seal means to seal said first half cover with respect to said second half cover;

second seal means to seal said evaporator plate with respect to said chamber;

third seal means to seal said first half cover with respect to said evaporator plate; and a perforated plate between said filtering means and said evaporator plate.

5. The device for purifying lubricating oil of impurities of claim 1 further comprising:

separating means connected with said outlet passage of said spiral-shaped passage for separating said lubricating oil into a first stream and a second stream;

first connection means connected with said separating means and said at least one inlet of said chamber for connecting said first stream of said lubricating oil with said at least one inlet of said chamber; and second connection means connected with said separating means, said second connection means being adapted to connect said second stream of said lubricating oil with said pump means.

6. The device for purifying lubricating oil of impurities of claim 1 further comprising a sieve located between said spiral-shaped first and second channel for filtering said lubricating oil.

7. The device for purifying lubricating oil of impurities of claim 1, wherein said source of vacuum comprises a vacuum pump connected to said second outlet of said chamber.

8. The device for purifying lubricating oil of impurities of claim 7 wherein said source of vacuum comprises a supercharger for an internal combustion engine connected to said second outlet of said chamber, said supercharger cooperating with said vacuum pump so as to maintain a constant value of reduced pressure which is substantially below atmospheric pressure in said evaporation chamber irrespective of operation of said supercharger.

* * * * *

UNITED STATES PATENT AND TRADEMARK OFFICE
CERTIFICATE OF CORRECTION

PATENT NO. : 4,830,745
DATED : May 16, 1989
INVENTOR(S) : Alfred van der Meulen

It is certified that error appears in the above-identified patent and that said Letters Patent is hereby corrected as shown below:

Column 3, line 15, delete "tuular" and insert ---- tubular ----.

Column 3, line 40, delete "whereby" and insert ---- where ----.

Column 4, line 3, delete "accordingly" and insert ---- according ----.

Column 5, line 68, after "that" insert ---- in ----.

Column 6, line 35, delete "18" and insert ---- 28 ----.

Column 6, line 36, delete " 17" " (first occurrence) and insert ---- 17' ----.

Column 6, line 37, delete "17" " (first occurrence) and insert --17'--.

Signed and Sealed this

Twenty-eighth Day of August, 1990

Attest:

HARRY F. MANBECK, JR.

*Attesting Officer*  *Commissioner of Patents and Trademarks*